(12) United States Patent
Moini et al.

(10) Patent No.: US 9,174,849 B2
(45) Date of Patent: Nov. 3, 2015

(54) MOLECULAR SIEVE PRECURSORS AND SYNTHESIS OF MOLECULAR SIEVES

(75) Inventors: Ahmad Moini, Princeton, NJ (US); Saeed Alerasool, Princeton Junction, NJ (US); Subramanian Prasad, Edison, NJ (US)

(73) Assignee: BASF Corporation

( * ) Notice: Subject to any disclaimer, the term of this patent is extended or adjusted under 35 U.S.C. 154(b) by 421 days.

(21) Appl. No.: 13/592,726

(22) Filed: Aug. 23, 2012

(65) Prior Publication Data

US 2013/0052125 A1   Feb. 28, 2013

Related U.S. Application Data

(60) Provisional application No. 61/527,312, filed on Aug. 25, 2011.

(51) Int. Cl.
| | | |
|---|---|---|
| C01B 39/48 | (2006.01) | |
| C01B 39/04 | (2006.01) | |
| C01B 39/30 | (2006.01) | |
| B82Y 30/00 | (2011.01) | |

(52) U.S. Cl.
CPC ............... *C01B 39/48* (2013.01); *C01B 39/04* (2013.01); *B82Y 30/00* (2013.01); *C01B 39/305* (2013.01)

(58) Field of Classification Search
CPC ....... B82Y 30/00; C01B 39/305; B01B 39/48
USPC .................................................. 423/702, 706
See application file for complete search history.

(56) References Cited

U.S. PATENT DOCUMENTS

| | | | |
|---|---|---|---|
| 3,030,181 A | 4/1962 | Milton et al. | |
| 4,440,871 A | 4/1984 | Lok et al. | |
| 4,544,538 A * | 10/1985 | Zones | 423/706 |
| 4,961,917 A | 10/1990 | Byrne | |
| 6,162,415 A | 12/2000 | Liu et al. | |
| 6,669,924 B1 | 12/2003 | Kaliaguine et al. | |
| 7,264,789 B1 | 9/2007 | Verduijn et al. | |
| 7,485,282 B2 | 2/2009 | Pinnavaia et al. | |
| 7,601,662 B2 * | 10/2009 | Bull et al. | 502/60 |
| 8,883,119 B2 * | 11/2014 | Bull et al. | 423/703 |
| 2005/0234136 A1 | 10/2005 | Holland et al. | |
| 2007/0104643 A1 | 5/2007 | Holland | |
| 2010/0104500 A1 | 4/2010 | Holland | |
| 2010/0310440 A1 | 12/2010 | Bull et al. | |
| 2011/0251048 A1 * | 10/2011 | Ariga et al. | 502/60 |

FOREIGN PATENT DOCUMENTS

| | | |
|---|---|---|
| GB | 868846 | 5/1961 |
| JP | 20100168269 A | 8/2010 |

(Continued)

OTHER PUBLICATIONS

Barrer, R. M. et al., "The Hydrothermal Chemistry of the Silicates. Part VIII Synthetic Potassium Aluminosilicates", *Imperial College of Sciece*, London Oct. 25, 1955, 12 pgs.

(Continued)

*Primary Examiner* — David M Brunsman

(57) ABSTRACT

Molecular sieves, improved methods for their synthesis, and catalysts, systems and methods of using these molecular sieves as catalysts in a variety of processes such as abating pollutants in exhaust gases and conversion processes are described. The molecular sieves are made using a tailored colloid including an alumina source, a silica source and a structure directing agent.

29 Claims, 1 Drawing Sheet

(56) References Cited

FOREIGN PATENT DOCUMENTS

| WO | 9308125 A1 | 4/1993 |
|---|---|---|
| WO | WO-03/020641 | 3/2003 |
| WO | 2011064186 A1 | 6/2011 |

OTHER PUBLICATIONS

Bleken, Francesca et al., "The Effect of Acid Strength on the Conversion of Methanol to Olefins Over Acidic Microporous Catalysts with the CHA Topology", *Top Catal 52*: 2009, 218-228.

Corkery, Robert W. et al., "Low-Temperature Synthesis and Characterization of a Stable Colloidal TPA-Silicalite-1 Suspension", *Zeolites 18* 1997, pp. 379-386.

Holland, Brian T., "Transformation of Mostly Amorphous Mesoscopic Aluminosilicate Colloids Into High Surface Area Mesoporous ZSM-5", *Microporous and Mesoporous Materials 89* 2006, pp. 291-299.

Schoeman, Brian J. et al., "A Study of the Initial Stage in the Crystallization of TPA-Silicalite-1", *Zeolites 17* 1996, pp. 447-456.

Extended Search Report received in European Patent Application No. 12825021.4 issued Apr. 28, 2015, 10 pages.

\* cited by examiner

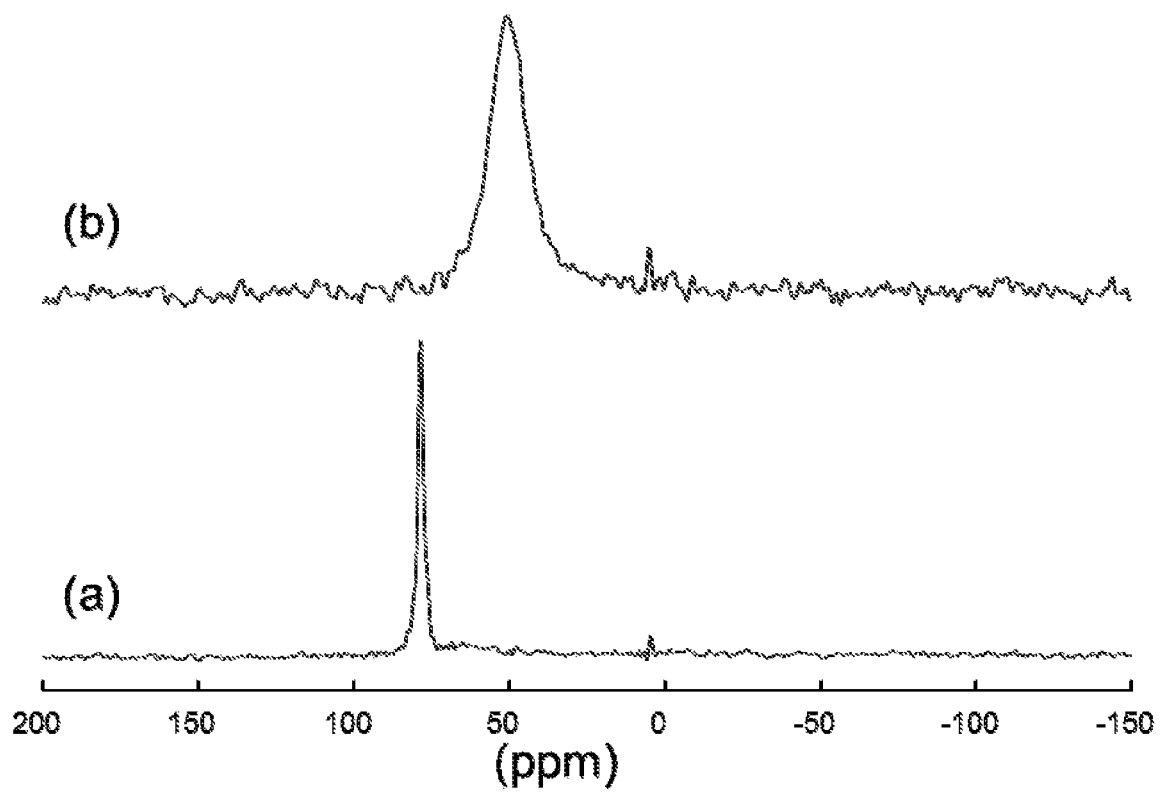

MOLECULAR SIEVE PRECURSORS AND SYNTHESIS OF MOLECULAR SIEVES

CROSS-REFERENCE TO RELATED APPLICATIONS

This application claims priority under 35 U.S.C. §119(e) to U.S. Patent Application Ser. No. 61/527,312, filed Aug. 25, 2011, which is incorporated herein by reference in its entirety.

TECHNICAL FIELD

The present invention pertains to the field of molecular sieves. More particularly, embodiments of the invention relate to improved methods for molecular sieve synthesis, and catalysts, systems and methods of using these molecular sieves as catalysts in a variety of processes such as abating pollutants in exhaust gases.

BACKGROUND

Molecular sieves such zeolites have been used extensively to catalyze a number of chemical reactions in refinery and petrochemical reactions, and catalysis, adsorption, separation, and chromatography. For example, with respect to zeolites, both synthetic and natural zeolites and their use in promoting certain reactions, including conversion of methanol to olefins (MTO reactions) and the selective catalytic reduction (SCR) of nitrogen oxides with a reductant such as ammonia, urea or a hydrocarbon in the presence of oxygen, are well known in the art. Zeolites are crystalline materials having rather uniform pore sizes which, depending upon the type of zeolite and the type and amount of cations included in the zeolite lattice, range from about 3 to 10 Angstroms in diameter. Zeolites having 8-ring pore openings and double-six ring secondary building units, particularly those having cage-like structures have recently found interest in use as SCR catalysts. A specific type of zeolite having these properties is chabazite (CHA), which is a small pore zeolite with 8 member-ring pore openings (~3.8 Angstroms) accessible through its 3-dimensional porosity. A cage like structure results from the connection of double six-ring building units by 4 rings.

Catalysts employed in the SCR process ideally should be able to retain good catalytic activity over the wide range of temperature conditions of use, for example, 200° C. to 600° C. or higher, under hydrothermal conditions. Hydrothermal conditions are often encountered in practice, such as during the regeneration of a soot filter, a component of the exhaust gas treatment system used for the removal of particles.

Metal-promoted zeolite catalysts including, among others, iron-promoted and copper-promoted zeolite catalysts, for the selective catalytic reduction of nitrogen oxides with ammonia are known. Iron-promoted zeolite beta (U.S. Pat. No. 4,961,917) has been an effective commercial catalyst for the selective reduction of nitrogen oxides with ammonia. Unfortunately, it has been found that under harsh hydrothermal conditions, for example exhibited during the regeneration of a soot filter with temperatures locally exceeding 700° C., the activity of many metal-promoted zeolites begins to decline. This decline is often attributed to dealumination of the zeolite and the consequent loss of metal-containing active centers within the zeolite.

The synthesis of a zeolite varies according to structure type of the zeolite, but usually, zeolites are synthesized using a structure directing agent, sometimes referred to as a template or organic template) together with sources of silica and alumina. The structure directing agent can be in the form of an organic, i.e. tetraethylammonium hydroxide (TEAOH), or inorganic cation, i.e. $Na^+$ or $K^+$. During crystallization, the tetrahedral silica-alumina units organize around the SDA to form the desired framework, and the SDA is often embedded within the pore structure of the zeolite crystals.

Metal-promoted, particularly copper promoted aluminosilicate zeolites having the CHA structure type and a silica to alumina molar ratio greater than 2, particularly those having a silica to alumina ratio greater than or equal to 5, 10, or 15 and less than about 1000, 500, 250, 100 and 50 have recently solicited a high degree of interest as catalysts for the SCR of oxides of nitrogen in lean burning engines using nitrogenous reductants. This is because of the wide temperature window coupled with the excellent hydrothermal durability of these materials, as described in U.S. Pat. No. 7,601,662. Prior to the discovery of metal promoted zeolites described in U.S. Pat. No. 7,601,662, while the literature had indicated that a large number of metal-promoted zeolites had been proposed in the patent and scientific literature for use as SCR catalysts, each of the proposed materials suffered from one or both of the following defects: (1) poor conversion of oxides of nitrogen at low temperatures, for example 350° C. and lower; and (2) poor hydrothermal stability marked by a significant decline in catalytic activity in the conversion of oxides of nitrogen by SCR. Thus, the invention described in U.S. Pat. No. 7,601,662 addressed a compelling, unsolved need to provide a material that would provide conversion of oxides of nitrogen at low temperatures and retention of SCR catalytic activity after hydrothermal aging at temperatures in excess of 650° C.

In view of the considerable interest of in molecular sieves having 8-ring pore openings and double-six ring secondary building units, particularly those having the CHA structure type, there is an on-going desire to improve the process of preparing such zeolites.

SUMMARY

In a first embodiment, a zeolite precursor comprises colloidal particles, each particle including alumina, silica and a first structure directing agent, the amounts of the alumina, silica and the first structure directing agent present in amount sufficient to form a zeolite having 8-ring pore openings and double-six ring secondary building units. In a second embodiment, the ratio of structure directing agent to silica is less than about 0.07. In a third embodiment, the ratio of structure directing agent to silica is less than about 0.06. In a fourth embodiment, the ratio of structure directing agent to silica is less than about 0.04. In a fifth embodiment, the ratio of structure directing agent to precursor is less than about 0.02.

In a sixth embodiment, the first through fifth embodiments can include the provision that the first structure directing agent comprises an adamantyl-substituted compound. In a seventh embodiment, the first through sixth embodiments can include the provision that the first structure directing agent comprises an adamantlyammonium compound. In an eighth embodiment, the first through seventh embodiments can include the provision that wherein the first structure directing agent comprises trimethyl adamantylammonium cation.

In a ninth embodiment, the first through eighth embodiments can include the provision that the colloidal solution is stable at room temperature for at least 30 days. In a tenth embodiment, the first through ninth embodiments can include the provision that colloidal solution has a pH of less than 12 or 11. In an eleventh embodiment, the first through tenth embodiments can include the provision that the colloidal particles have a $SiO_2$ to $Al_2O_3$ molar ratio in the range of 10 to 1000. In a twelfth embodiment, the first through eleventh embodiments can include the provision that the colloidal particles have a $SiO_2$ to $Al_2O_3$ molar ratio in the range of 20 and 40.

In a thirteenth embodiment, the first through twelfth embodiments can include the provision that the colloidal solution contains an additional metal selected from iron, copper, cerium, cobalt, platinum and combinations thereof. In a fourteenth embodiment, the first through thirteenth embodiments can include a second structure directing agent. In a fifteenth embodiment, the fourteenth embodiment can include the provision that the second structure directing agent comprises benzyl-substituted compounds. In a sixteenth embodiment, the thirteenth and fourteenth embodiments can include the provision that the second structure directing agent comprises a benzyl trimethylammonium cation. In a seventeenth embodiment, the thirteenth through fifteenth embodiments can include the provision that the second structure directing agent comprises quaternary cations based on 1,4-diazabicyclo[2.2.2]octane In an eighteenth embodiment, the first through the seventeenth embodiments can include the provision that the zeolite has a structure type selected from AEI, AFT, AFX, CHA, EAB, ERI, KFI, LEV, SAS, SAT, and SAV. In a nineteenth embodiment, the first through the eighteenth embodiments can include the provision that the zeolite has the CHA structure type.

In a twentieth embodiment, the first through the nineteenth embodiments can include the provision that the colloidal particles have an average particle size less than about 100 nm. In a twenty-first embodiment, the first through the twentieth embodiments can include the provision that the colloidal particles have an average particle size in the range of about 10 nm to 50 nm. In a twenty-second embodiment, the first through the twenty-first embodiments can include the provision that the colloidal particles have a particle size $D_{90}$ of less than about 100 nm. In a twenty-third embodiment, the first through the twenty-second embodiments can include the provision the colloidal particles have a particle size $D_{90}$ in the range of about 70 nm to 100 nm.

A twenty-fourth embodiment of the invention pertains to a method of making a zeolite having 8-ring pore openings and double-six ring secondary building units, the method comprising providing a solution of colloidal particles including alumina, silica and a first structure directing agent, the colloidal solution having a first pH, and performing a crystallization process including optionally adjusting the pH of the colloidal solution and hydrothermally treating the colloidal solution to form a zeolite. In a twenty-fifth embodiment, the twenty-fourth embodiment can be modified so that the colloidal solution is formed a first reaction vessel and the crystallization process is performed up to 6 months after forming the colloidal solution. In a twenty-sixth embodiment, the twenty-fourth and twenty-fifth embodiments can be modified so that the crystallization process is performed in a second reaction vessel. In a twenty-seventh embodiment, the twenty-fourth through twenty-sixth embodiments can be modified so that prior to the crystallization process, the colloidal solution has a pH of less than about 11 or 12. In a twenty-eighth embodiment, the twenty-fourth through twenty-seventh embodiments can be modified so that hydrothermally treating the colloidal solution includes heating the colloidal solution to a temperature exceeding 100° C. In a twenty-ninth embodiment, the twenty-fourth through twenty-eighth embodiments can be modified so that hydrothermally treating the colloidal solution includes heating the solution in the range of about 140° C. to about 180° C. and at a pressure in the range of about 25 and 200 psi. In a thirtieth embodiment, the twenty-fourth through twenty-ninth embodiments can be modified so that the zeolite has a structure type selected from AEI, AFT, AFX, CHA, EAB, ERI, KFI, LEV, SAS, SAT, and SAV. In a thirty-first embodiment, the twenty-fourth through thirtieth embodiments can be modified so that the zeolite has the CHA structure type. In a thirty-second embodiment, the twenty-fourth through thirty-first embodiments can be modified so that the colloidal particles have a $SiO_2$ to $Al_2O_3$ molar ratio in the range of 20 and 40. In a thirty-third embodiment, the twenty-fourth through thirty-second embodiments can be modified so that the colloidal solution contains an additional metal selected from iron, copper, cerium, cobalt, platinum and combinations thereof.

A thirty-fourth embodiment comprises a method of making an aluminosilicate zeolite having 8-ring pore openings and double-six ring secondary building units, the method comprising providing a colloidal solution including colloidal particles including alumina, silica and a first structure directing agent, the ratio of the structure directing agent to silica of less than about 0.07 and hydrothermally treating the colloidal solution to form a zeolite. In a thirty-fifth embodiment, the thirty-fourth embodiment can be modified so that the zeolite has a structure type selected from AEI, AFT, AFX, CHA, EAB, ERI, KFI, LEV, SAS, SAT, and SAV. In a thirty-sixth embodiment, the thirty-fourth through thirty-fifth embodiments can be modified so that the zeolite has the CHA structure type. In a thirty-seventh embodiment, the thirty-fourth through thirty-sixth embodiments can be modified so that the colloidal particles have a $SiO_2$ to $Al_2O_3$ molar ratio in the range of 20 and 40. In a thirty-eighth embodiment, the thirty-fourth through thirty-seventh embodiments can be modified so that the colloidal solution contains an additional metal selected from iron, copper, cerium, cobalt, platinum and combinations thereof.

A thirty-ninth embodiment pertains to a zeolite made by any of the methods of the first through thirty-eight embodiments. In a fortieth embodiment, the thirty ninth embodiment includes the provision that the zeolite has primary crystals less than 100 nm in diameter. In a forty-first embodiment, the zeolite has primary crystals less than 50 nm in diameter.

A forty second embodiment pertains to a catalyst made from the precursor obtained from any of the first through twenty-third embodiments. A forty-third embodiments pertains to a catalyst made from zeolite including a method of the twenty-fourth through thirty-third embodiments. A forty-fourth embodiment pertains to a zeolite made from the method of the thirty-forth through thirty-eight embodiments.

Embodiment 45 pertains to a process for the selective catalytic reduction of NO comprising contacting a gas containing NOx with a catalyst according to embodiment 42. Embodiment 46 pertains to a process for the selective catalytic reduction of NOx comprising contacting a gas containing NOx with a catalyst according to embodiment 43. Embodiment 47 pertains to a process for the selective catalytic reduction of NOx comprising contacting a gas containing NOx with a catalyst according to embodiment 44. Embodiment 48 pertains to process for converting methanol to olefin (MTO) comprising contacting methanol with a catalyst according to embodiment 42. Embodiment 49 pertains to a process for converting methanol to olefin (MTO) comprising contacting methanol with a catalyst according to embodiment 43.

Embodiment 50 pertains to a process for converting methanol to olefin (MTO) comprising contacting methanol with a catalyst according to embodiment 44.

Embodiment 51 pertains to a modification of the first through twenty-fourth embodiments in which the zeolite has an aluminum-27 nuclear magnetic resonance (NMR) peak in the frequency shift range of 77-50 ppm with full width at half maximum of 100 to 2000 Hz.

BRIEF DESCRIPTION OF THE DRAWING

FIG. 1 show NMR spectra of samples prepared in accordance with Example 7 (spectrum labeled (b)) and Example 8 (spectrum labeled (a)).

DETAILED DESCRIPTION

Before describing several exemplary embodiments of the invention, it is to be understood that the invention is not limited to the details of construction or process steps set forth in the following description. The invention is capable of other embodiments and of being practiced or being carried out in various ways.

Embodiments of the invention are directed to zeolites, methods for their preparation, catalysts including zeolites, exhaust gas systems, and methods of abating pollutants from exhaust gases using such zeolites. Specific embodiments are directed to zeolites having 8-ring pore openings and double-six ring secondary building units, for example, those having the following structure types: AEI, AFT, AFX, CHA, EAB, ERI, KFI, LEV, SAS, SAT, and SAV. According to one or more embodiments, it will be appreciated that by defining the zeolites by their structure type, it is intended to include the structure type and any and all isotypic framework materials such as SAPO, ALPO and MeAPO materials having the same structure type. In more specific, embodiments, reference to an aluminosilicate zeolite structure type limits the material to zeolites that do not include phosphorus or other metals substituted in the framework. Of course, aluminosilicate zeolites may be subsequently ion-exchanged with one or more promoter metals such as iron, copper, cobalt, nickel, cerium or platinum group metals. However, to be clear, as used herein, "aluminosilicate zeolite" excludes aluminophosphate materials such as SAPO, ALPO, and MeAPO materials, and the broader term "zeolite" is intended to include aluminosilicates and aluminophosphates.

In general, the SCR catalyst based on that chabazite aluminosilicate zeolite should exhibit comparable NOx conversion activity with the catalysts of the state of the art obtained via multi-step synthesis (copper exchange into $NH_4$-Chabazite). In general, the catalyst should exhibit both good low temperature NOx conversion activity ($NO_x$ conversion>50% at 200° C.) and good high temperature NOx conversion activity ($NO_x$ conversion>70% at 450° C.). The NO activity is measured under steady state conditions at maximum $NH_3$-slip conditions in a gas mixture of 500 ppm NO, 500 ppm $NH_3$, 10% $O_2$, 5% $H_2O$, balance $N_2$ at a volume-based space velocity of 80,000 $h^{-1}$.

As used in this specification and the appended claims, the term "$Na^+$-form of chabazite" refers to the calcined form of this zeolite without any ion exchange. In this form, the zeolite generally contains a mixture of $Na+$ and $H+$ cations in the exchange sites. The fraction of sites occupied by $Na+$ cations varies depending on the specific zeolite batch and recipe.

A molecular sieve can be zeolitic-zeolites- or non-zeolitic, and zeolitic and non-zeolitic molecular sieves can have the chabazite crystal structure, which is also referred to as the CHA structure by the International Zeolite Association. Zeolitic chabazite include a naturally occurring tectosilicate mineral of a zeolite group with approximate formula: $(Ca, Na_2, K_2, Mg)Al_2Si_4O_{12} \cdot 6H_2O$ (e.g., hydrated calcium aluminum silicate). Three synthetic forms of zeolitic chabazite are described in "Zeolite Molecular Sieves," by D. W. Breck, published in 1973 by John Wiley & Sons, which is hereby incorporated by reference. The three synthetic forms reported by Breck are Zeolite K-G, described in J. Chem. Soc., p. 2822 (1956), Barrer et al; Zeolite D, described in British Patent No. 868,846 (1961); and Zeolite R, described in U.S. Pat. No. 3,030,181, which are hereby incorporated by reference. Synthesis of another synthetic form of zeolitic chabazite, SSZ-13, is described in U.S. Pat. No. 4,544,538, which is hereby incorporated by reference. Synthesis of a synthetic form of a non-zeolitic molecular sieve having the chabazite crystal structure, silicoaluminophosphate 34 (SAPO-34), is described in U.S. Pat. No. 4,440,871 and No. 7,264,789, which are hereby incorporated by reference. A method of making yet another synthetic non-zeolitic molecular sieve having chabazite structure, SAPO-44, is described in U.S. Pat. No. 6,162,415, which is hereby incorporated by reference.

In specific embodiments the copper containing molecular sieves with the CHA structure include all aluminosilicate, borosilicate, gallosilicate, MeAPSO, and MeAPO compositions. These include, but are not limited to SSZ-13, SSZ-62, natural chabazite, zeolite K-G, Linde D, Linde R, LZ-218, LZ-235, LZ-236ZK-14, SAPO-34, SAPO-44, SAPO-47, ZYT-6, CuSAPO-34, CuSAPO-44, and CuSAPO-47. However, in specific embodiments, the material will have the aluminosilicate composition, such as SSZ-13 and SSZ-62, which would exclude borosilicate, gallosilicate, MeAPSO, SAPO and MeAPO compositions.

Conventional Zeolite Synthesis of CHA-Type Zeolites

In what may be referred to as a conventional synthesis of an alkali metal (for example $Na^+$ or $K^+$)-zeolites having the CHA structure, a source of silica, a source of alumina, and a structure directing agent are mixed under alkaline aqueous conditions. Typical silica sources include various types of fumed silica, precipitated silica, and colloidal silica, as well as silicon alkoxides. Typical alumina sources include boehmites, pseudo-boehmites, aluminum hydroxides, aluminum salts such as aluminum sulfate or sodium aluminate, and aluminum alkoxides. Sodium hydroxide is typically added to the reaction mixture. A typical structure directing agent for this synthesis is adamantyltrimethyl ammonium hydroxide, although other amines and/or quaternary ammonium salts may be substituted or added to the latter directing agent. The reaction mixture is heated in a pressure vessel with stirring to yield the crystalline SSZ-13 product. Typical reaction temperatures are in the range of 100 and 200° C., and in specific embodiments between 135 and 170° C. Typical reaction times are between 1 hr and 30 days, and in specific embodiments, between 10 hours and 3 days.

At the conclusion of the reaction, optionally the pH is adjusted to between 6 and 10, and in specific embodiments, between 7 and 7.5, and the product is filtered and washed with water. Any acid can be used for pH adjustment, and in specific embodiments nitric acid is used. Alternatively, the product may be centrifuged. Organic additives may be used to help with the handling and isolation of the solid product. Spray-drying is an optional step in the processing of the product. The solid product is thermally treated in air or nitrogen. Alternatively, each gas treatment can be applied in various sequences, or mixtures of gases can be applied. Typical calcination temperatures are in the 400° C. to 850° C. range.

Optionally $NH_4$-Exchange to Form $NH_4$-Chabazite:

Optionally, the obtained alkali metal zeolite is $NH_4$-exchanged to form $NH_4$-Chabazite. The $NH_4$— ion exchange can be carried out according to various techniques known in the art, for example Bleken, F.; Bjorgen, M.; Palumbo, L.;

Bordiga, S.; Svelle, S.; Lillerud, K.-P.; and Olsbye, U. Topics in Catalysis 52, (2009), 218-228.

Synthesis of CHA-Type Zeolites According to Embodiments of the Invention

According to one or more embodiments, improved methods for the synthesis of CHA-type zeolites, particularly CHA-type aluminosilicate zeolites such as SSZ-13 and SSZ-62 are provided. It has been discovered that by using what may be referred to as a tailored colloid approach to zeolite synthesis, the amount of structure directing agent used can be dramatically reduced per kg of zeolite product obtained during synthesis. As will be appreciated, any reduction in the cost of the raw materials such as the amount of expensive structure directing agent will have a significant positive impact on the overall production cost of this material. The tailored colloid approach uses a "tailored colloid" to manufacture the zeolite, and the tailored colloid contains predetermined amounts of silica, alumina and the structure directing agent to make the zeolite. An alternate benefit is normal template usage but preferred zeolite attributes, such as improved crystallinity, crystal size and morphology.

In one or more embodiments, "colloid" and other like terms including "colloidal," "sol," and the like refer to a two-phase system having a dispersed phase and a continuous phase. The colloids of the present invention have a solid phase dispersed or suspended in a continuous or substantially continuous liquid phase, typically an aqueous solution. Thus, the term "colloid" encompasses both phases whereas "colloidal particles" or "particles" refer to the dispersed or solid phase. In specific embodiments, "colloid" and "colloidal" refers to a suspension of particles having an average particle size (D50) of less than about 500 nm, specifically, an average particle size of less than about 250 nm, and more specifically, an average particle size less than about 100 nm. In more specific embodiments, the D50 of the colloidal particles is less than about 100 nm, more specifically less than about 50 nm, and in most specific embodiments in the range of about 10 nm to 50 nm. In other specific embodiments, the D90 of the colloidal particles is less than about 150 nm, for example, in the range of 70 nm to 100 nm. As used herein D90 refers to the particle size of 90% of the particles as measured by light scattering techniques, for example, Dynamic Light Scattering (DLS), more particularly, using a Malvern Zetasizer, available from Malvern Instruments.

In one or more embodiments, "stable" means that the solid phase of the colloid is present, dispersed throughout the medium, and stable throughout this entire pH range with effectively no precipitate. In specific embodiments, "stable" may refer to a colloidal molecular sieve or zeolite precursor that the colloidal solution is maintained without any substantial precipitation or gelation for a given period of time, for example, at least about 1 day, 1 week, 1 month, 2 months, 3 months, 6 months, 1 year or longer.

In specific embodiments, the zeolite is substantially comprised of alumina and silica and has a silica to alumina ratio in the range of about 1 to 1000, and in specific embodiments from 1 to 500, and in more specific embodiments from 10 to 300, 10 to 200, 10 to 100, 10 to 90, 10 to 80, 10 to 70, 10 to 60, 10 to 50, 10 to 40, 10 to 35 and 10 to 30 are within the scope of the invention. In specific embodiments, the zeolite is SSZ-13 and/or SSZ-62.

Thus, one aspect of the invention pertains to a zeolite precursor comprising colloidal particles, each particle including alumina, silica and a first structure directing agent, the amounts of the alumina, silica and the first structure directing agent present in amount sufficient to form a zeolite having the CHA crystal structure. As discussed above, a conventional synthetic route of a CHA-type zeolite can involve large quantities of structure directing agent such that the ratio of structure directing agent to silica exceeds 0.10, 0.15 and/or 0.20. According to one or more embodiments of the invention, the zeolite precursor comprising colloidal particles including an alumina source, a silica source and the first structure directing agent contain an amount of the first structure directing agent such that the ratio of the first structure directing agent to silica is less than about 0.20, 0.19, 0.18, 0.17, 0.16, 0.15, 0.14, 0.13, 0.12, 0.11, 0.10, 0.09, 0.08, 0.07, 0.06, 0.05, 0.04, 0.03 and 0.02 or lower.

The first structure directing agent can be an adamantyl-substituted compound, for example, an adamantylammonium compound such as an N,N,N-adamantylammonium compound, specifically, the adamantyl trimethylammonium cation.

A second structure directing agent may also be included. Substituted benzyl compounds may serve this role. One specific example is benzyl trimethylammonium cation. The amount of organic in the colloid can correspond to a $R1/SiO_2$ ratio in the range of approximately 0.01 to 0.1 and $R2/SiO_2$ ratio in the range of approximately 0.01 to 0.1.

According to one or more embodiments, Colloidal Precursors Containing Templates can have the following attributes:

Silica-to-alumina ($SiO_2/Al_2O_3$) ratio in a desired range. In specific embodiments, a range of 20 to 40, for example, about 30, is of interest.

Solids content, defined as total weight of silica plus alumina relative to the total weight of the colloidal solution of approximately 5% to 40%, for example, 20%, is of interest)

The organic template (R) can be adamantyl trimethylammonium cation. However, other choices, such as those indicated in the claims are of interest.

The amount of organic in the colloid corresponded to $R/SiO_2$ ratio in the range of approximately of 0.04 to 0.08, for example 0.055.

Manufacture of the colloidal precursor can be achieved in accordance with the techniques described in B.T. Holland, Transformation of mostly amorphous mesoscopic aluminoslicate colloids into high surface area mesoporous ZSM-5, Microporous and Mesoporous Materials 89 (2006) 291-299 and United States Patent Application Publication No. US2005/0234136 and United States Patent Application Publication No. US2010/0104500.

Other cations such as sodium and ammonium cations may be present as will be understood from Example 1.

Ion Exchange of Metal

In specific embodiments, a suitable metal ion to promote the SCR of oxides of nitrogen is exchanged into the zeolite material. Suitable metals include, but are not limited to copper, iron, cobalt, nickel, cerium, platinum, palladium, rhodium and combinations thereof. In specific embodiments, copper is ion exchanged into the zeolite. The metal can be exchanged after manufacture of the zeolite. According to one or more embodiments, at least a portion of the metal can be included in the tailored colloid such that the tailored colloid contains the structure directing agent, a silica source, and alumina source and a metal ion (e.g., copper) source. The metal can be associated with the zeolite in ways other than ion exchange. Copper-exchange into to alkali metal or $NH_4$-Chabazite to form metal-Chabazite:

In specific embodiments, copper is ion exchanged into alkali metal or $NH_4$-Chabazite to form Cu-Chabazite. When copper acetate is used, the copper concentration of the liquid copper solution used in the copper ion-exchange is in specific embodiments in the range from about 0.01 to about 0.4 molar, more specifically in the range from about 0.05 to about 0.3 molar, even more specifically in the range from about 0.1 to about 0.25 molar, even more specifically in the range from about 0.125 to about 0.25 molar, even more specifically in the range from about 0.15 to about 0.225 molar and even more specifically in the range from about 0.2.

According to an embodiment of the present invention, the molecular sieve material (which may be zeolitic material or non-zeolitic material) of the invention is used in a catalytic process, for example, as a catalyst and/or catalyst support, and more specifically as a catalyst. In general, the molecular sieve material of the invention can be used as a catalyst and/or catalyst support in any conceivable catalytic process, wherein processes involving the conversion of at least one organic compound, more specifically of organic compounds comprising at least one carbon-carbon and/or carbon-oxygen and/or carbon-nitrogen bond, more specifically of organic compounds comprising at least one carbon-carbon and/or carbon-oxygen bond, and even more specifically of organic compounds comprising at least one carbon-carbon bond. In particularly specific embodiments of the present invention, the molecular sieve material is used as a catalyst and/or catalyst support in any one or more of methanol-to-olefin (MTO) reactions, ethylene-to-propylene (ETP) reactions, as well as of the co-reaction of methanol and ethylene (CME). The processes involve contacting the compounds with the catalysts according to embodiments of the invention.

According to a further embodiment of the present invention, the molecular sieve material of the invention used in a catalytic process involving the conversion of at least one compound comprising at least one nitrogen-oxygen bond. According to one or more embodiments of the present invention the molecular sieve material is used as a catalyst and/or catalyst support in a selective catalytic reduction (SCR) process for the selective reduction of nitrogen oxides NOx; for the oxidation of $NH_3$, in particular for the oxidation of $NH_3$ slip in diesel systems; for the decomposition of $N_2O$. The term nitrogen oxides, $NO_x$, as used in the context of the present invention designates the oxides of nitrogen, especially dinitrogen oxide ($N_2O$), nitrogen monoxide (NO), dinitrogen trioxide ($N_2O_3$), nitrogen dioxide ($NO_2$), dinitrogen tetroxide ($N_2O_4$), dinitrogen pentoxide ($N_2O_5$), nitrogen peroxide ($NO_3$). According to particularly specific embodiments of the present invention, the molecular sieve material used in a catalytic process involving the conversion of at least one compound comprising at least one nitrogen-oxygen bond comprises Cu and/or Fe, and more specifically Cu. The process can be accomplished by contacting the compound with a catalyst according to an embodiment of the invention.

Therefore, the present invention also relates to a method for selectively reducing nitrogen oxides NOx by contacting a stream containing NOx with a catalyst containing the molecular sieve material according to the present invention under suitable reducing conditions; to a method of oxidizing $NH_3$, in particular of oxidizing $NH_3$ slip in diesel systems, by contacting a stream containing $NH_3$ with a catalyst containing the molecular sieve material having an CHA-type framework structure according to the present invention under suitable oxidizing conditions; to a method of decomposing of $N_2O$ by contacting a stream containing $N_2O$ with a catalyst containing the molecular sieve material under suitable decomposition conditions; to a method of controlling emissions in Advanced Emission Systems such as Homogeneous Charge Compression Ignition (HCCI) engines by contacting an emission stream with a catalyst containing the molecular sieve material under suitable conditions; to a fluid catalytic cracking FCC process wherein the molecular sieve material is employed as additive; to a method of converting an organic compound by contacting said compound with a catalyst containing the molecular sieve material under suitable conversion conditions; to a "stationary source" process wherein a catalyst is employed containing the molecular sieve material.

Accordingly, embodiments of the present invention also relates to a method for selectively reducing nitrogen oxides $NO_x$, wherein a gaseous stream containing nitrogen oxides $NO_x$, specifically also containing ammonia and/urea, is contacted with the molecular sieve material according to the present invention or the molecular sieve material obtainable or obtained according to the present invention, for example, in the form of a molded catalyst, specifically as a molded catalyst wherein the molecular sieve material is deposited on a suitable refractory carrier, still more specifically on a "honeycomb" carrier.

The nitrogen oxides which are reduced using a catalyst containing the molecular sieve material obtainable or obtained according to embodiments of the present invention may be obtained by any process, e.g. as a waste gas stream. Among others, waste gas streams as obtained in processes for producing adipic acid, nitric acid, hydroxylamine derivatives, caprolactame, glyoxal, methyl-glyoxal, glyoxylic acid or in processes for burning nitrogeneous materials may be mentioned.

In specific embodiments, the molecular sieve material or the molecular sieve material obtainable or obtained according to embodiments of the present invention is used as a molded catalyst, still more specifically as a molded catalyst wherein the molecular sieve material is deposited on a suitable refractory carrier, still more specifically on a "honeycomb" carrier, for the selective reduction of nitrogen oxides $NO_x$, i.e. for selective catalytic reduction of nitrogen oxides. In particular, the selective reduction of nitrogen oxides wherein the molecular sieve material according to an embodiment of the present invention is employed as catalytically active material is carried out in the presence ammonia or urea. While ammonia is the reducing agent of choice for stationary power plants, urea is the reducing agent of choice for mobile SCR systems. Typically, the SCR system is integrated in the engine and vehicle design and, also typically, contains the following main components: SCR catalyst containing the molecular sieve material according to an embodiment of the present invention; a urea storage tank; a urea pump; a urea dosing system; a urea injector/nozzle; and a respective control unit.

More specific embodiments pertain to the use of a catalyst containing the molecular sieve material according to the present invention or the molecular sieve material obtainable or obtained according to the inventive process for removal of nitrogen oxides $NO_x$ from exhaust gases of internal combustion engines, in particular diesel engines, which operate at combustion conditions with air in excess of that required for stoichiometric combustion, i.e. in a lean operation mode.

Therefore, embodiments the present invention also relates to a method for removing nitrogen oxides NOx from exhaust gases of internal combustion engines, in particular diesel engines, which operate at combustion conditions with air in excess of that required for stoichiometric combustion, i.e., at lean conditions, wherein a catalyst containing the molecular sieve material according to the present invention or the molecular sieve material obtainable or obtained according to the present invention is employed as catalytically active material.

Embodiments of the present invention therefore relates to the use of the molecular sieve material of the invention, in particular in the field of catalysis and/or in the treatment of exhaust gas, wherein said exhaust gas treatment comprises industrial and automotive exhaust gas treatment. In these and other applications, the molecular sieve material of the present invention can by way of example be used as a molecular sieve, catalyst, and/or catalyst support.

Furthermore, according to embodiments of the present invention, the molecular sieve material is used as a molecular trap for organic compounds. In general, any type of organic compound may be trapped in the molecular sieve material, wherein in specific embodiments, the compound is reversibly trapped, such that it may be later released from the molecular sieve material, specifically wherein the organic compound is released—specifically without conversion thereof—by an increase in temperature and/or a decrease in pressure. Furthermore, in specific embodiments the molecular sieve material is used to trap organic compounds of which the dimensions allow them to penetrate the microporous system of the molecular structure. According to yet further embodiments of the present invention, the trapped compounds are released under at least partial conversion thereof to a chemical derivative and/or to a decomposition product thereof, specifically to a thermal decomposition product thereof.

Therefore, an embodiment of the present invention also relates to the use of a molecular sieve material according to embodiments and specific embodiments of the present invention as a molecular sieve, catalyst, catalyst support, and/or as an adsorbent, wherein the molecular sieve material is specifically used as a molecular trap for chemical compounds, as a catalyst and/or as a catalyst support.

EXAMPLES

Example 1

Preparation of Colloidal Precursor for Zeolite Synthesis

A colloidal precursor is synthesized having a predetermined silica to alumina ratio and a predetermined structure directing agent to silica ratio using a silica source, an alumina source and a first structure directing agent present in amount sufficient to form a zeolite having the CHA crystal structure. A suitable silica source includes silicic acid. Suitable alumina sources include aluminum chlorohydrate, aluminum chloride hexahydrate, as well as other soluble sources of aluminum. An example of a suitable first structure directing agent for forming a zeolite having the CHA structure is an adamantyl-substituted compound, for example, an adamantylammonium compound such as an N,N,N-adamantylammonium compound, specifically, trimethyl adamantylammonium hydroxide. A reactor vessel is then charged with the suitable amounts of alumina and silica sources and structure directing agent to provide the desired silica to alumina ratio and structure directing agent to silica ratio. The amount of water can be varied to provide an acceptable solids content. The order of addition to the reactor can be varied, but generally, it is desirable to heat in the range of about 75-120°, e.g. 90-95° C.

Optionally, a secondary structure directing agent can be used with the first structure directing agent to reduce the amount of the first structure directing agent used in the synthesis of zeolites in accordance with one or more embodiments. Suitable examples include benzyl trimethyl ammonium cation and quaternary cations based on 1,4-diazabicyclo[2.2.2]octane as well as other adamantyl-substituted quaternary cations.

Optionally, a promoter metal in the form of multivalent cation, for example, from the transition series or a rare earth series, including but not limited to iron, copper, cerium, cobalt, platinum can be added in the colloid or later on. The specific amounts of the silica and alumina can be varied to provide the desired silica to alumina ratio desired for the final zeolite product. The specific amounts provided immediately below are exemplary and non-limiting. Silica to alumina ratios ranging from 10 to 1000, and in specific embodiments from 10 to 500, and in more specific embodiments from 10 to 300, 10 to 200, 10 to 100, 10 to 90, 10 to 80, 10 to 70, 10 to 60, 15 to 50, 20 to 40, 25 to 35 are within the scope of the invention.

Silica Source

The source of silica is silicic acid. The silicic acid is produced by passing a solution containing 25.00 g of sodium silicate in 57.37 g of DI water through a column containing the cation exchange resin, Dowex 650 C(H+). About 40 mL of resin for 100 g of diluted sodium silicate solution is used.

Alumina Source 0.75 g of a 50% solution of aluminum chlorohydrate is used as the source of alumina.

Reaction

The aluminum chlorohydrate solution is added directly to 40 g of a 8% silicic acid solution. A five-neck reactor vessel equipped with a mechanical stirrer and reflux condenser is charged with 59.72 g of a 1.03% solution of trimethyl adamantylammonium hydroxide solution and heated to 90° C. To this, the silicic acid/aluminum chlorohydrate solution is added over 1.25 h. A clear solution results, which is heated under reflux for 30 h. Optionally, the template solution and the silicic acid/aluminum chlorohydrate solution can be added to an alkaline solution such as diluted NaOH.

Examples 2-5

For Examples 2-5, Colloidal Precursors Containing Templates had the following attributes:

Silica-to-alumina ($SiO_2/Al_2O_3$) ratio of approximately 30 (broader range of 20 to 40 is relevant)

Solids content, defined as total weight of silica plus alumina relative to the total weight of the colloidal solution, of approximately 20%.

The organic template (R) was adamantyl trimethylammonium cation.

The amount of organic in the colloid corresponded to $R/SiO_2$ ratio of approximately 0.055.

Other cations such as sodium and ammonium cations may be present as will be understood from Example 1.

Example 2

63 g of a colloidal template containing precursor was mixed with 63 g deionized water. To this mixture was added 0.25 g of 10% NaOH solution. The final solution had a pH of 10.9. This colloidal solution was introduced into a 300 mL stirred autoclave. Once the autoclave was sealed, the stirring rate was set at 250 rpm. The reaction was conducted at 170° C. for 40 hours. At the conclusion of this experiment, the autoclave was allowed to cool. The product was filtered and thoroughly washed. The XRD of the solid product was identified as having the CHA zeolite structure. The calcined product had BET surface area of 423 $m^2/g$. Scanning electron microscopy (SEM) using a beam of approximately 5.0 KV and up to 50,000 magnification)) images showed very small uniform primary crystals (generally in the range of 40 to 50 nm diameter) which formed particles (generally in the range of 2 to 5 μm diameter) that formed larger aggregate particles (generally in the range of 10 to 50 μm diameter).

Example 3

69.6 g of a template-containing colloid was mixed with 69.6 g deionized water. To this mixture was added 0.55 g of 10% NaOH solution. The final solution had a pH of 10.59. This colloidal solution was introduced into a 300 mL stirred autoclave. Once the autoclave was sealed, the stirring rate was set at 250 rpm. The reaction was conducted at 170° C. for 40 hours. At the conclusion of this experiment, the autoclave was allowed to cool. The product was filtered and thoroughly washed. The XRD of the solid product was identified as having the CHA zeolite structure. The calcined product had BET surface area of 446 m2/g. Scanning electron microscopy (SEM-using a beam of approximately 5.0 KV and up to 50,000 magnification) images showed very small primary crystals (generally in the range of 40 to 50 nm diameter) that formed particles (generally in the range of 2 to 5 μm diameter) that formed larger aggregate particles (generally in the range of range of 10 to 50 μm diameter).

Example 4

63 g of template-containing colloid was mixed with 63 g deionized water. To this mixture was added 0.55 g of 10% NaOH solution. The final solution had a pH of 10.8. This colloidal solution was introduced into a 300 mL stirred autoclave. Once the autoclave was sealed, the stirring rate was set at 250 rpm. The reaction was conducted at 170° C. for 40 hours. At the conclusion of this experiment, the autoclave was allowed to cool. The product was filtered and thoroughly washed. The XRD of the solid product was identified as having the CHA zeolite structure. The calcined product had BET surface area of 420 m2/g.

Example 5

63 g of template-containing colloid was mixed with 63 g deionized water. To this mixture was added 0.25 g of 10% NaOH solution. The final solution had a pH of 10.7. This colloidal solution was introduced into a 300 mL stirred autoclave. Once the autoclave was sealed, the stirring rate was set at 250 rpm. The reaction was conducted at 170° C. for 40 hours. At the conclusion of this experiment, the autoclave was allowed to cool. The product was filtered and thoroughly washed. The XRD of the solid product was identified as having the CHA zeolite structure. The calcined product had BET surface area of 394 m2/g.

Example 6

The template-containing colloid had the following attributes:
Silica-to-alumina ($SiO_2/Al_2O_3$) ratio of approximately 30.
Solids content, defined as total weight of silica plus alumina relative to the total weight of the colloidal solution, of approximately 20%.
The organic templates (R1 and R2) were adamantyl trimethylammonium cation and benzyl trimethylammonium cation, respectively.
The amount of organic in the colloid corresponded to $R1/SiO_2$ ratio of approximately 0.04 and $R2/SiO_2$ ratio of approximately 0.04 (broader range of 0.03 to 0.05 for both $R1/SiO_2$ and $R2/SiO_2$ are relevant for these experiments, although even broader ranges are of interest in general)
65 g of a template-containing colloid was mixed with 65 g deionized water. To this mixture was added 0.55 g of 10% NaOH solution. The final solution had a pH of 11.0. This colloidal solution was introduced into a 300 mL stirred autoclave. Once the autoclave was sealed, the stirring rate was set at 250 rpm. The reaction was conducted at 170° C. for 40 hours. At the conclusion of this experiment, the autoclave was allowed to cool. The product was filtered and thoroughly washed. The XRD of the solid product was identified as having the CHA zeolite structure.

Example 7

A colloidal precursor as characterized in Examples 2-6 was further characterized was analyzed using nuclear magnetic resonance (NMR).
NMR experiments were performed on a Varian Unity INOVA 400 MHz spectrometer using a Chemagnetics magic-angle spinning NMR probe. Gel samples (ca 50 microliter) were loaded into leak-proof 4 mm zirconia rotors. Typically 2048 scans were acquired using a pulse width of 1 microsecond and a relaxation delay of 1-5 seconds under static conditions. Aqueous aluminum nitrate solution (1 molar) set to 0 ppm was used as a reference.
For background reference, it is know from the literature that an aluminum-27 NMR spectra of aluminosilicate solutions may exhibit five resonances in the following frequency shift ranges: 80-78, 77-73, 72-67, 66-62, and 61-51 ppm, assigned, respectively, to q0, q1, q2, q3, and q4, where q stands for tetrahedral $AlO_4$ environment and superscript refers to number of siloxane bridges. See, e.g., J. W. Akitt, W. Gessner, Aluminium-27 Nuclear Magnetic Resonance Investigations of Highly Alkaline Aluminate Solutions. J. Chem. Soc. Dalton Trans. 1984, 147-148; R. K. Harris, J. Parkinson, A. Samadi-Maybodi, W. Smith, "Exchange Reactions in Aluminosilicate Solutions", Chem. Commun. 1996, 593-594; and E. A. Eilertsen, M. Haouas, A. B. Pinar, N. D. Hould, R. F. Lobo, K. P. Lillerud, F. Taulelle, "NMR and SAXS Analysis of Connectivity of Aluminum and Silicon Atoms in the Clear Sol Precursor of SSZ-13 Zeolite", Chem. Mater. 2012, 24, 571-578.
A colloidal zeolite precursor representative of the present invention with the colloidal particles composed of silica, alumina, and adamantyltrimethyl ammonium cations was analyzed.

Comparative Example 8

NMR Analysis

A precursor representative of a traditional zeolite synthesis approach, was prepared by mixing the following ingredients:
12.6 g 50% NaOH
58.52 g distilled deionized water
20.16 g aluminum isoporpoxide
97.68 g adamantyltrimethylammonium hydroxide (20.5% solution)
237.6 g AS-40 colloidal silica.
NMR analysis was performed in accordance with Example 7.

Example 9

NRM Data

FIG. 1 compares representative NMR spectra of the colloidal precursor of Example 7 and the traditional aluminosilicate precursor of Example 8. The frequency shift of 78.2 ppm in the traditional aluminosilicate precursor is assigned to $q^0$ species, while frequency shift of 51 in the colloidal precursor is assigned to $q^4$ species. Faster molecular reorientation at the NMR time scale gives narrow resonance (full-width-at-half-maximum=200±5 Hz) and is consistent with the assignment to monomeric $q^0$ species, possibly $Al(OH)_4^-$ charge-compensated by Na+ and the template cation. Increased linewidth (full-width-at-half-maximum=1390±30 Hz) is indicative of slower molecular motion and/or increase in electric field gradient of larger entities such as $q^4$ species (for e.g., Al—$(OSiO_3)_4$). The minor peak (<0.5%) near zero ppm is attributed to aluminum in $AlO_6$ environment.

Example 10

The template-containing colloid had the following attributes:

Silica-to-alumina ($SiO_2/Al_2O_3$) ratio of 25.39.

Solids content, defined as total weight of silica plus alumina relative to the total weight of the colloidal solution, of approximately 22.62%.

The organic template (R) was adamantyl trimethylammonium cation.

The amount of organic in the colloid corresponded to $R/SiO_2$ ratio of approximately 0.055.

638 g of the template-containing colloid was mixed with 638 g deionized water. The final solution had a pH of 10.6. This colloidal solution was introduced into a 2 L stirred autoclave. Once the autoclave was sealed, the stirring rate was set at 250 rpm. The reaction was conducted at 170° C. for 40 hours. At the conclusion of this experiment, the autoclave was allowed to cool. The product was filtered and thoroughly washed. The XRD of the solid product was identified as having the CHA zeolite structure. The product had a BET surface area of 488 $m^2/g$.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A zeolite precursor comprising a solution comprising colloidal particles, wherein:
    each particle comprises alumina, silica, and a first structure directing agent; and
    the amounts of the alumina, silica, and the first structure directing agent are present in amount sufficient to form a zeolite having 8-ring pore openings and double-six ring secondary building units.

2. The zeolite precursor of claim 1, wherein a ratio of the structure directing agent to the silica is less than about 0.07.

3. The zeolite precursor of claim 1, wherein the first structure directing agent comprises an adamantyl-substituted compound.

4. The zeolite precursor of claim 1, wherein the first structure directing agent comprises an adamantylammonium compound.

5. The zeolite precursor of claim 4, wherein the first structure directing agent comprises trimethyl adamantylammonium cation.

6. The zeolite precursor of claim 1, wherein the colloidal solution is stable at room temperature for at least 30 days.

7. The zeolite precursor of claim 1, wherein the colloidal solution has a pH of less than 12.

8. The zeolite precursor of claim 7, wherein the colloidal solution has a pH of less than 11.

9. The zeolite precursor of claim 1, wherein the colloidal particles have a $SiO_2$ to $Al_2O_3$ molar ratio from 10 to 1000.

10. The zeolite precursor of claim 1, wherein the colloidal particles have a $SiO_2$ to $Al_2O_3$ molar ratio from 20 to 40.

11. The zeolite precursor of claim 1, wherein the solution contains an additional metal selected from iron, copper, cerium, cobalt, platinum and combinations thereof.

12. The zeolite precursor of claim 3 further comprising a second structure directing agent.

13. The zeolite precursor of claim 12, wherein the second structure directing agent comprises a benzyl-substituted compound.

14. The zeolite precursor of claim 1, wherein the zeolite has a structure type that is AEI, AFT, AFX, CHA, EAB, ERI, KFI, LEV, SAS, SAT, or SAV.

15. The zeolite precursor of claim 13, wherein the zeolite has the CHA structure type.

16. The zeolite precursor of claim 1, wherein the colloidal particles have an average particle size of less than about 100 nm.

17. The zeolite precursor of claim 16, wherein the colloidal particles have an average particle size from about 10 nm to about 50 nm.

18. The zeolite precursor of claim 1 having an aluminum-27 nuclear magnetic resonance (NMR) peak in the frequency shift range of 77-50 ppm with full width at half maximum of 100 to 2000 Hz.

19. A zeolite made from the precursor of claim 1.

20. The zeolite of claim 19, having primary crystals less than 100 nm in diameter.

21. The zeolite precursor of claim 1, wherein the alumina is derived from aluminum chlorohydrate, to form the colloid particle.

22. A method of making a zeolite having 8-ring pore openings and double-six ring secondary building units, the method comprising
    providing a solution of colloidal particles comprising alumina, silica, and a first structure directing agent, wherein the solution has a first pH; and
    performing a crystallization process comprising adjusting the pH of the solution and hydrothermally treating the solution to form a zeolite.

23. The method of claim 22, wherein the solution is formed in a first reaction vessel, and the crystallization process is performed up to 6 months after forming the solution.

24. The method of claim 23, wherein the crystallization process is performed in a second reaction vessel.

25. The method of claim 22, wherein prior to the crystallization process, the solution has a pH of less than about 12, and hydrothermally treating the solution comprises heating the solution to a temperature exceeding 100° C.

26. The method of claim 25, wherein the solution has a pH of less than 11.

27. The method of claim 22, wherein the zeolite has a structure type that is AEI, AFT, AFX, CHA, EAB, ERI, KFI, LEV, SAS, SAT, or SAV.

28. The method of claim 27, wherein the zeolite has the CHA structure type.

29. The method of claim 22, wherein the structure directing agent and the silica are present in a ratio of less than about 0.07 structure directing agent to silica.

* * * * *